L. GAUMONT.
MECHANISM FOR INTERMITTENTLY ADVANCING THE FILM IN KINEMATOGRAPHIC APPARATUS.
APPLICATION FILED JAN. 31, 1913.
1,084,938.
Patented Jan. 20, 1914.
2 SHEETS—SHEET 2.
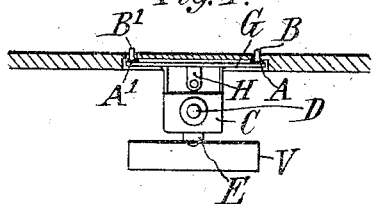
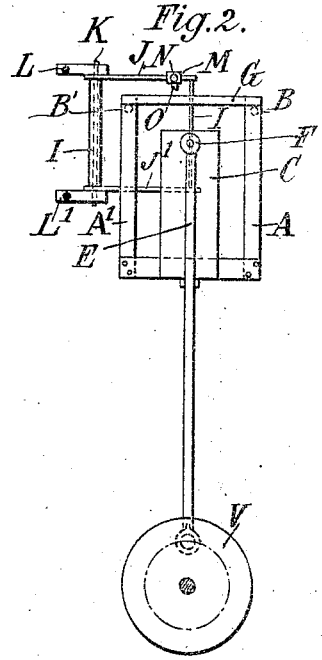
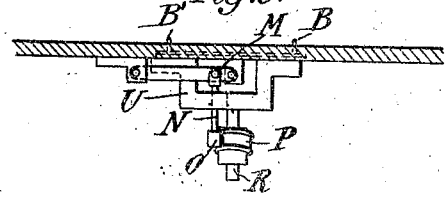
WITNESSES:
INVENTOR:
Leon Gaumont
By Attorneys,

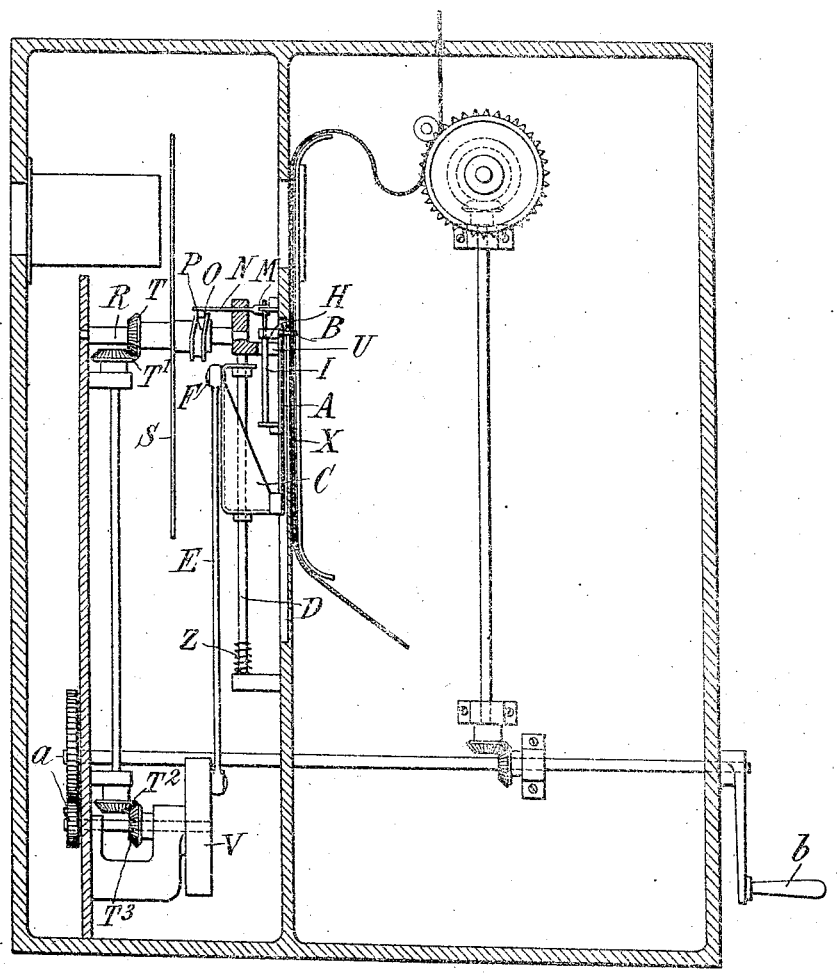

UNITED STATES PATENT OFFICE.

LÉON GAUMONT, OF PARIS, FRANCE, ASSIGNOR TO SOCIÉTÉ DES ÉTABLISSEMENTS GAUMONT, OF PARIS, FRANCE.

MECHANISM FOR INTERMITTENTLY ADVANCING THE FILM IN KINEMATOGRAPHIC APPARATUS.

1,084,938.

Specification of Letters Patent.  Patented Jan. 20, 1914.

Application filed January 31, 1913. Serial No. 745,380.

*To all whom it may concern:*

Be it known that I, LÉON GAUMONT, a citizen of the Republic of France, residing in Paris, France, have invented certain new and useful Improvements in Mechanism for Intermittently Advancing the Film in Kinematographic Apparatus, of which the following is a specification.

The present invention has for its object a mechanism for intermittently advancing the film in kinematographic apparatus, which will be readily and clearly understood from the following description and reference to the accompanying drawing, in which:—

Figure 1 is a partial sectional elevation of the said feed machine. Fig. 2 is a side elevation thereof, and Fig. 3 is a plan, Fig. 4 is a plan of the slide block alone.

This feed mechanism is constituted by two flexible plates A and A' carrying at their upper extremity the feed fingers B B'. These plates are fixed at their lower part to an exceedingly light slide block C which moves upon a rod D forming an integral part of the frame of the apparatus. The plates A and A' are stayed at the upper part by a member G comprising a protuberance H which is adapted to slide upon a vertical rod I forming part of a rigid frame J J', I'. This frame itself is pivoted upon a shaft K integral with two bearings L L' fixed to the frame-work of the apparatus. This side J of the frame is connected at M with a small rod N which passes through the guide support U while its other end O is engaged in a cam slot or groove P rigid with the shaft R and with the shutter S. The movement of rotation is imparted to the latter by the intermediary of four bevel pinions T T' T² T³ of which the latter is rigidly connected with the shaft of the crank disk V. This crank disk by the intermediary of a pitman E transmits a vertical reciprocating movement to the slide block C upon which the pitman is pivoted at F. The movement of rotation of the crank disk V is imparted to it by means of gear wheels a and appropriate operating rods and the crank b.

The operation of the mechanism is as follows:—As shown in Fig. 1, the slide block occupies the upper part of its travel and the fingers B and B' are engaged in the perforations in the film X to be displaced. If the crank disk V be rotated, the slide block C and the plates A and A' are caused to descend, together with the feed fingers B and B' and the cross piece G. At the moment at which the crank disk has brought the slide block to the bottom of its travel, the cam P, by the intermediary of the roller O, will displace the small rod N which, in its displacement will produce the rotation on the shaft K of the frame I, J, I', J' thus separating the cross piece G from the framework of the apparatus; consequently the feed fingers B and B' will leave the perforations. As the crank plate V continues its movement, the assemblage constituted by the slide block, the plates A and A' and the fingers B and B', will assume an upward movement and when the whole occupies the upper position, the cam, P which has continued its own movement of rotation, will press back the rod N, which in its turn will act upon the frame I, J, I', J', and will permit the flexible plates A, A' to again cause their fingers B and B' to enter the perforations in the film, and so on in succession. Toward the end of the down stroke the slide block C compresses the spring Z which serves always to limit in the same direction the play that the pitman E is able to effect upon the trunnion F.

The special feature of this mechanism is that the feed fingers always occupy exactly the same position at the lower point, that is to say at the moment at which their tractive effort upon the film ceases and this still obtains even after the apparatus has been in use a considerable time, owing to the elimination of the play which is always set up between mechanical elements which are relatively displaceable.

What is claimed is:—

1. Mechanism for intermittently feeding a film in kinematographic apparatus, comprising a slide block, a pitman and a crank for reciprocating said slide block, said block carrying flexible plates provided with feed fingers, and means for flexing said flexible plates for withdrawing said fingers from the film at an appropriate time in the movement of said slide block.

2. Mechanism for intermittently feeding a film in kinematographic apparatus, comprising a slide block, a pitman and a crank for reciprocating said slide block, said block carrying flexible plates provided with feed fingers, an oscillating frame having a sliding connection with said flexible plates, and means for oscillating said frame for flexing said flexible plates for withdrawing said fingers from the film at an appropriate time in the movement of said slide block.

3. Mechanism for intermittently feeding a film in kinematographic apparatus, comprising a slide block, a pitman and a crank for reciprocating said slide block, said block carrying flexible plates provided with feed fingers, a pivoted oscillatory frame, a rod therein slidingly engaging said flexible plates, and means for oscillating said frame for flexing said plates to withdraw said fingers from the film at an appropriate time in the movement of said guide block.

4. Mechanism for intermittently feeding a film in kinematographic apparatus, comprising a slide block, a pitman and a crank for reciprocating said slide block, said block carrying flexible plates provided with feed fingers, and means for flexing said flexible plates for withdrawing said fingers from the film at an appropriate time in the movement of said slide block, said slide block having a spring in its path which is adapted to be compressed at the end of the down stroke of said block for limiting in one direction the play which may arise in the operating members.

In witness whereof, I have hereunto signed my name in the presence of two subscribing witnesses.

LÉON GAUMONT.

Witnesses:
HANSON C. COXE,
GABRIEL BELLIARD.